United States Patent [19]
Abrahamson et al.

[11] 3,786,782
[45] Jan. 22, 1974

[54] MILK FLOW SENSING VALVE FOR TEAT CUP RELEASE

[76] Inventors: Walter Frank Abrahamson; John Hougham Abrahamson; Boris Hougham Abrahamson, all of R. D. 6, Otorohanga, New Zealand

[22] Filed: June 30, 1972

[21] Appl. No.: 268,122

[30] Foreign Application Priority Data
June 30, 1971 New Zealand.................... 164144
Mar. 3, 1972 New Zealand.................... 166474

[52] U.S. Cl. ............................................. 119/14.08
[51] Int. Cl. .............................................. A01j 5/04
[58] Field of Search............ 119/14.08, 14.14, 14.55

[56] References Cited
UNITED STATES PATENTS

| | | | |
|---|---|---|---|
| 2,887,986 | 5/1959 | Golemon .......................... | 119/14.08 |
| 2,718,208 | 9/1955 | Tanner............................. | 119/14.08 |
| 1,276,803 | 8/1918 | Paarmann......................... | 199/14.08 |
| 3,185,132 | 5/1965 | Allard................................ | 119/14.08 |
| 3,556,053 | 1/1971 | Padman et al.................... | 119/14.08 |

*Primary Examiner*—Hugh R. Chamblee

[57] ABSTRACT

A milk flow sensing valve unit particularly for location in a milk line to a set of teat cups and whereby vacuum supply to the teat cups can be cut off, or at least substantially reduced, to effect release of the teat cups from the animal upon cessation or substantial reduction in milk flow from the animal. The sensing valve unit including a hollow body defining a milk receiving float chamber housing a float member which is arranged to actuate and hold open valve means on filling of the chamber with milk from the teat cups to permit milk discharge through a main outlet to which vacuum is applied. A secondary or drain outlet is provided for emptying the chamber after cessation of milking and the arrangement providing that the float member will hold the valve means open whilst there is full milk flow from an animal in excess of the milk flow permitted through the secondary or drain outlet, but when the milk flow from the animal into the chamber falls below the flow rate through the secondary or drain outlet, the float lowers to close the valve means and shut off vacuum supply to the upper part of the chamber and milk inlet to thus shut off vacuum supply to the teat cups and permit the teat cups to fall away from the cows udder.

5 Claims, 4 Drawing Figures

MILK FLOW SENSING VALVE FOR TEAT CUP RELEASE

This invention relates to milk flow sensing valve units for effecting the release of teat cups from the udder of a cow being milked, and more particularly relates to a sensing valve unit for location in a milk line to a set of teat cups and whereby vacuum supply to the teat cups can be cut off, or least substantially reduced, to effect release of the teat cups from the animal upon cessation or substantial reduction in milk flow from the animal.

An object of this invention is to provide a sensing valve unit of the kind referred to and which is relatively simple in construction and operation, whilst being efficient and effective in use.

More particular objects and advantages of the invention will become apparent from the ensuing description.

According to this invention therefore, there is provided a milk flow sensing valve unit for effecting teat cup release comprising a hollow body defining a milk receiving float chamber, a float member within the chamber, a milk inlet to the chamber and through which milk from the milking teat cups can pass, a vacuum supply and milk discharge conduit connected to the body and having a main outlet opening to the chamber and whereby vacuum is supplied to the chamber and inlet, valve means actuable by the float member and held open by the float member on filling of the chamber with milk to permit milk discharge through the main outlet, drain means for emptying the chamber after cessation of milking, and there being means to effect initial supply of vacuum from the main outlet to the chamber and inlet to enable commencement of milking and the valve means being closable by the float member at least to substantially reduce vacuum to the chamber upper part and the inlet on cessation or substantial lessening of milk flow from the teat cups so that such vacuum reduction permits release of the teat cups from the animal.

Some aspects of the invention will now be described by way of example and with reference to the accompanying drawings, in which.

The sensing valve unit of this invention is arranged to control the vacuum supply to the teat cups of a milk line and such sensing valve unit can be positioned in the milk line at a point near the set of teat cups or milking claw, or may be incorporated as part of the teat cup or milking claw assembly. The sensing valve unit further provides that upon cessation, or substantial lessening of milk flow from the teat cups and through the unit, the vacuum supply to the teat cups is cut off or substantially reduced and thus the teat cups are released from the udder of a cow at completion of milking; it is accordingly preferable that suitable support means are provided for the teat cups to prevent such teat cups contacting the ground or milking shed floor when released from the animal, and the sensing valve unit of the present invention may be also associated with and arranged to actuate withdrawal mechanism or apparatus whereby the teat cups are withdrawn and supported in a 'home' position above the ground subsequent to release from the animal after milking.

The sensing valve unit includes a hollow body (generally indicated by the arrow 1) which may be cylindrical in form and is closed by upper and lower end walls, 2 and 3 respectively to define a float chamber 4 wherein a float member 5 is located. In the constructions according to FIGS. 1, 2, and 4, the float member 5 is generally cylindrical in form whereas, and as envisaged in FIG. 3, the float member 5 can be spherical or of other suitable form complementary to the form of the chamber 4.

Figure 1:
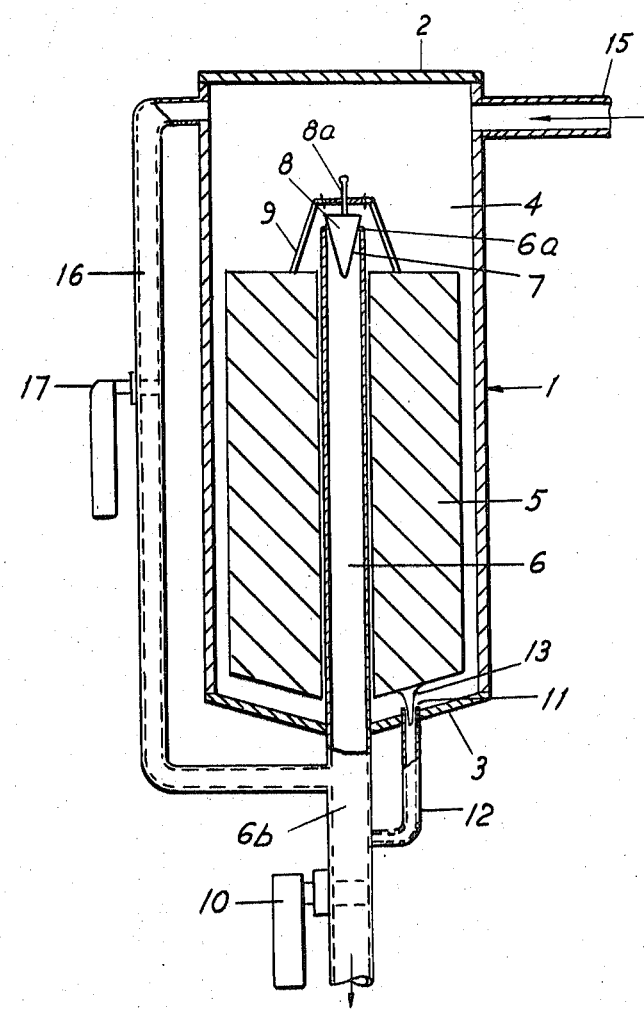
FIG. 1 is a sectional elevational view of a first form of the invention.
Figure 2:
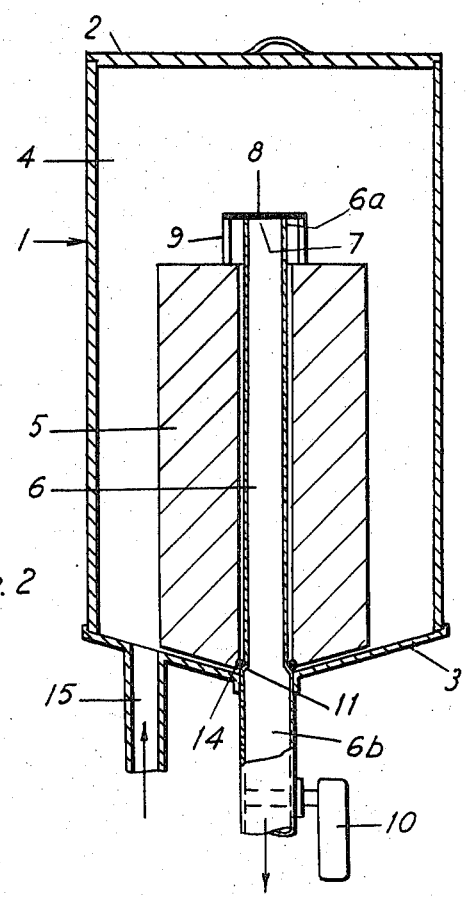
FIG. 2 is a sectional elevational view of a second form of the invention.

In the constructions according to FIGS. 1 and 2 of the drawings, a vacuum supply and milk discharge tube 6 extends upwardly within the cylindrical body 1 from and through the bottom wall 3 (to which it is sealed) and concentrically thereof, the float member 5 being in the form of an annulus slidably located about the central discharge tube 6.

The upper end part of the discharge tube 6 extends into the upper part of the body 1 and thus normally above the float member 5 when such float member 5 is at its lowest limit, and the upper end of such discharge tube is open in providing the main milk outlet 7 but such open upper end 7 is arranged to be closed by a valve member 8 secured to or forming part of the float member 5 when such float member 5 is at its lower limit ie. when the chamber 4 is empty or substantially empty of milk. The upper peripheral edge portion 6a of the discharge tube 6 may thus form or be provided with a valve seat and the valve member 8 is supported in relation thereto and thereabove by means of a bridge like support 9 secured to the float member 5. The valve member 8 can be of inverted conical form as illustrated by way of example in FIG. 1 of the drawings, and in such arrangement the cone shaped valve member 8 may be formed of metal or hard plastics and the mouth or outlet 7 of the discharge tube 6 may be provided with a resilient rubber or plastics ring forming the valve seat to ensure good shut-off as the cone shape valve member 8 enters the outlet 7. Alternatively, and as illustrated in FIG. 2, the valve member 8 can be in the form of a rubber or plastics disc, or a metal disc with a rubber or plastics peripheral part, which is arranged to seal upon the main upper outlet end of the discharge tube 6.

The lower end part 6b of the discharge tube 6 extends through and downwardly beyond the bottom wall 3 of the body 1 and is arranged for connection to the main vacuum supply and milk line whereby vacuum is supplied to the chamber 4 by way of the outlet or discharge tube 6 and whereby milk fed into the chamber from the milk teat cups (not shown) may pass to a milk receiving reservoir or pumping station. The outer lower end part 6b of the discharge tube 6 may be provided with a main on/off tap 10.

The sensing valve unit is further provided with a supplementary or drain outlet 11 in communication with the discharge tube 6, such outlet 11 is capable of draining milk from the chamber 4 and a flow rate less than the normal flow rate of milk from an animal at full milking and also provides that residual milk in the chamber 4 after closing off the main valve member 8 upon the main outlet 7 can be drained from such chamber 4. In a first form of the invention and as illustrated in FIG. 1, a drain outlet 11 is provided in the bottom wall 3 of the body 1 and is in communication with the lower outer end part 6b of the discharge tube 6 by way of a small bypass tube 12, and such drain outlet 11 is arranged to be closed by a second valve member 13 on the underside of the float member 5. The second valve member 13 can be in the form of such as a rubber disc arranged to seat upon the drain outlet 11, but may preferably be in the form of a needle or narrow tapered valve 13 which locates in the drain outlet 11, this latter arrangement ensuring that the drain outlet 11 is kept clear. The arrangement of the main and supplementary valves is such that the main valve member 8 closes upon its seat 6a as the float member 5 approaches its lower limit but before reaching its lower limit, and the supplementary or drain valve member 13, closes upon its seat to close the drain outlet 11 when or as the float member 5 reaches its lower limit. To provide such delayed action, the main valve member 8 may have an upwardly extending shaft 8a slidably located in an aperture in the bridge 9 of the float member 5 so that such main valve member 8 is permitted a limited amount of free up and down movement, the upper end of the valve member shaft 8a being provided with a stop whereby the main valve member 8 may be lifted as the float member 5 is raised. The drain outlet bypass tube 12 may be provided with such as a tap or compression means whereby flow of milk therethrough can be adjusted if so desired.

In an alternative form of drain outlet valve, and applicable to the annulus kind of float member 5 illustrated in FIG. 2 of the drawings, a drain outlet aperture 11 is provided in the wall of the discharge tube 6 at its lowest point above the bottom wall 3 of the body 1, and the bore of the annular float member 5 is provided at its bottom end with such as a rubber or plastics 0 ring or sleeve 14 which is arranged to locate over and seal the drain aperture 11 when the float member 5 reaches its lower limit. The diameter of the discharge tube 6 may be enlarged at the drain outlet and relative to the upper part of the tube 6 so that the float member 5 is not restricted in its movement.

The milk inlet 15 to the chamber 4 may be by way of one or more inlet tubes connected to the teat cups or teat cup claw and to either the bottom wall 3 (as in FIG. 2), an upper part of the side wall (as in the remaining figures), or the upper wall 2 of the body 1.

Means are provided to effect initial opening of the main valve member 8 relative to the main milk outlet 7 so that, following opening of the tap or valve 10 in the discharge tube 6, the chamber 4 may be placed under vacuum so that vacuum is supplied to the inlet 15 and thus to the teat cups for milking operations to commence. In one simple form of the invention, and where the sensing valve unit is separate from the milking claw, opening of the main valve member 8 may be simply effected by inverting the sensing valve unit so that the float member 5 may fall downwardly towards the normally upper end wall 2 and, upon milk flow commencing and there being sufficient milk in the chamber 4 to maintain the float 5 at a level sufficient to hold the main valve member 8 open, the sensing valve unit may then be returned to its upright position and supported in any suitable manner, i.e. such as by a hook and eye arrangement. The construction according to FIG. 2 can be inverted to commence milking. Alternatively, and as shown in FIG. 1, a by-pass conduit 16 may be provided in communication with the upper part of the chamber 4 and the vacuum supply/milk discharge tube external lower part 6b, the by-pass conduit 16 being provided with an on/off tap or valve 17 so that such tap 17 can be placed in the on position initially for the vacuum in the discharge tube 6 to by-pass the main valve 8 and be supplied to the chamber and inlet, and thus to the teat cups to enable teat cup connection and milking to commence. The tap 17 being turned to the off or closed position when full milking commences and the float member 5 raised to hold the valve member 8 off its seat. In further alternatives, the float member 5 can be raised manually such as by having a spring influenced plunger slidably located in the bottom wall 3 and which can be pushed upwardly to engage and lift the float member 5, or by having all or part of the bottom wall member 3 as a rubber or resilient plastics diaphragm which can be pushed inwardly such as by a cam like lever or trigger so that the inner surface of the bottom wall or diaphragm part 3 bulges inwardly to contact the underside of the float member 5 and lift such float member 5 to the required degree. Alternatively, the float member lifting plunger or resilient bottom wall 3 may be moved upwardly such as by a suitable mechanical device or an electric solenoid arrangement. Other float lift means can be employed.

In operation of these first two forms of the invention, according to FIGS. 1 and 2, the main discharge tube tap or valve 10 is turned on to supply vacuum to such discharge tube and the main outlet valve is opened either by operating the by-pass 16 or by inverting the valve unit or otherwise raising the float member 5 as aforesaid, so that vacuum is supplied to the milk chamber 4 within the body 1 and thus to the milk inlet 15, whereupon the teat cups may be applied to the animal's udder and retained in position by the vacuum. Milking of the animal commences and milk is fed by way the inlet 15 into the chamber 4 and when there is sufficient milk in the chamber 4 for the float member 5 to maintain the main valve member 8 off its valve seat at the discharge tube outlet 7, the by-pass tap 17 may then be closed or the sensing valve unit may be returned to its normal upright position or the float member lift means released, as the case may be. Whilst the float member 5 is thus maintained raised by milk flow into the chamber 4, the milk flow may fill the chamber 4 and overflow through the main outlet 7, a small quantity of milk will in the meantime be passing out through the drain aperture 11, but the dimensions of the drain aperture 11 are such that it cannot cope with the full milk flow. On milk flow from the animal ceasing or substantially reducing and the milk in the chamber 4 lessening, the float will lower until such time as the main valve member 8 closes upon the outlet 7 to thus cut off the vacuum supply to the chamber 4 through such main outlet 7 and thus cut off or substantially reduce the vacuum supplied to the inlet 15 and teat cups, whereupon the teat cups will release automatically from the cow's udder. The residual or remaining milk within the chamber 4 will then drain out through the drain outlet 11, and such draining is rapidly assisted as the outlet 11 is in communication with the discharge tube 6 and such discharge tube 6 is still under vacuum. Discharge of the milk through the drain outlet 11 may be at the rate of about one-half lb per minute to suit most milking conditions, but this rate of flow may be varied according to a user's requirements.

Figure 3:
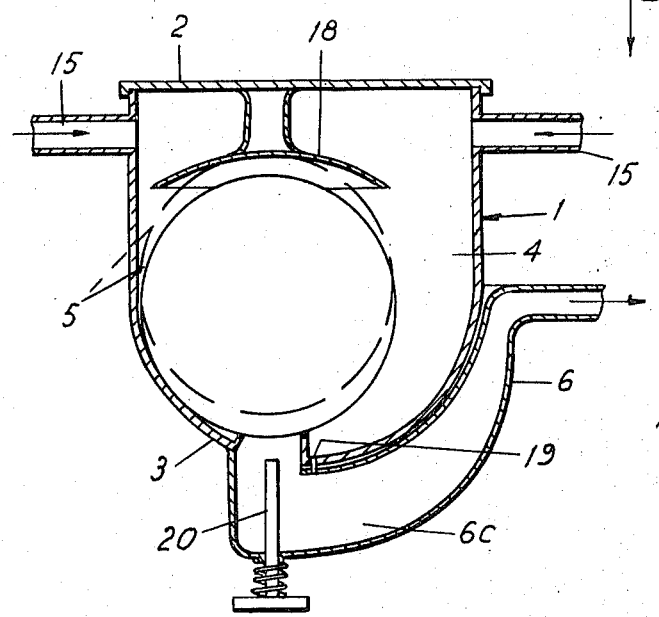
FIG. 3 is a sectional elevational view of a third form of the invention.

Referring now to FIG. 3 of the drawings, a further variation of the invention is illustrated and in this construction the body 1 has a semi-circular base part or wall 3 and the float member 5 is spherical or rounded, the main outlet 7 being provided at the base of the semi-circular part or wall 3 so that when the chamber 4 is empty, the spherical or rounded float member 5 will seat upon the outlet periphery forming the valve seat, the float member 5 thus forming also the main valve member. One or more milk inlets 15 may be provided at the upper part of the body 1 and an arcuate deflector plate 18 may be provided in the upper part of the chamber 4, depending from the upper wall 2 of the body 1 so that milk may flow onto the upper curved surface of such deflector plate 18 and the spherical or rounded float member 5 may locate on the under curved surface of the deflector plate 18 when the chamber 4 is filled with milk. The milk inlet or inlets 15 may be tangentially disposed relative to the upper cylindrical part of the body 1, or inclined relative to a radial line, so that the milk flow tends to move in a spiral path over the deflector plate 18 and within the chamber 4 so that there is a minimum of turbulence in such chamber 4. Also, the axis of the deflector plate 18 and main outlet 7 may be slightly off centre so that there is a main milk flow to one side of the chamber 4.

A vacuum supply/milk outlet passage 6, which may be provided in a tube part formed integrally with the main body part 1, extends from the main outlet 7 at the base or bottom wall 3, upwardly to a medial part of the body 1 for connection to a main vacuum line. The lower end part 6c of such passage 6 is enlarged to provide for milk return on surging and so that there is a tendency for milk to remain in such bottom part 6c and at the outlet 7 to maintain the float member 5 off its valve seat at the outlet 7 until milk flow ceases.

One or more small apertures 19 may be provided at the base of the body part 1 adjacent the main outlet 7 and in communication with the milk discharge passage 6. Such apertures 19 provide passages for air bubbles to be sucked from the main chamber 4 into the main flow of milk in the upper part of the outlet passage 6, as well as completing drainage of the main chamber 4 on closing of the float member 5 onto the outlet 7.

As in the previous arrangements, the float member 5 may be raised off its seat to prevent initial milking by inverting or tilting the sensing unit when provided as a separate unit, or by providing such as a manually, mechanically or electrically operated plunger 20 in the base part of the body 1 or outlet passage part and which is actuable to contact and lift the float member 5 until full milking commences. Thus, the float member 5 is initially raised or lifted off the outlet 7 to permit the chamber 4 and inlet 15 to be placed under vacuum and the teat cups connected to an animal's udder and, upon full flow of milk commencing the float member 5 is maintained open so that milk may be discharged from the main outlet 7. Upon milk flow from the animal ceasing or substantially reducing, the float member 5 lowers to finally seat upon the outlet 7 and shut off the vacuum to the chamber 4 and inlet 15 to permit release of the teat cups from the animal, the remaining milk in the bottom of the discharge tube 6 being sucked out by a vacuum applied to such discharge tube 6 until finally emptied and air passes through the air vent apertures 19.

Figure 4:
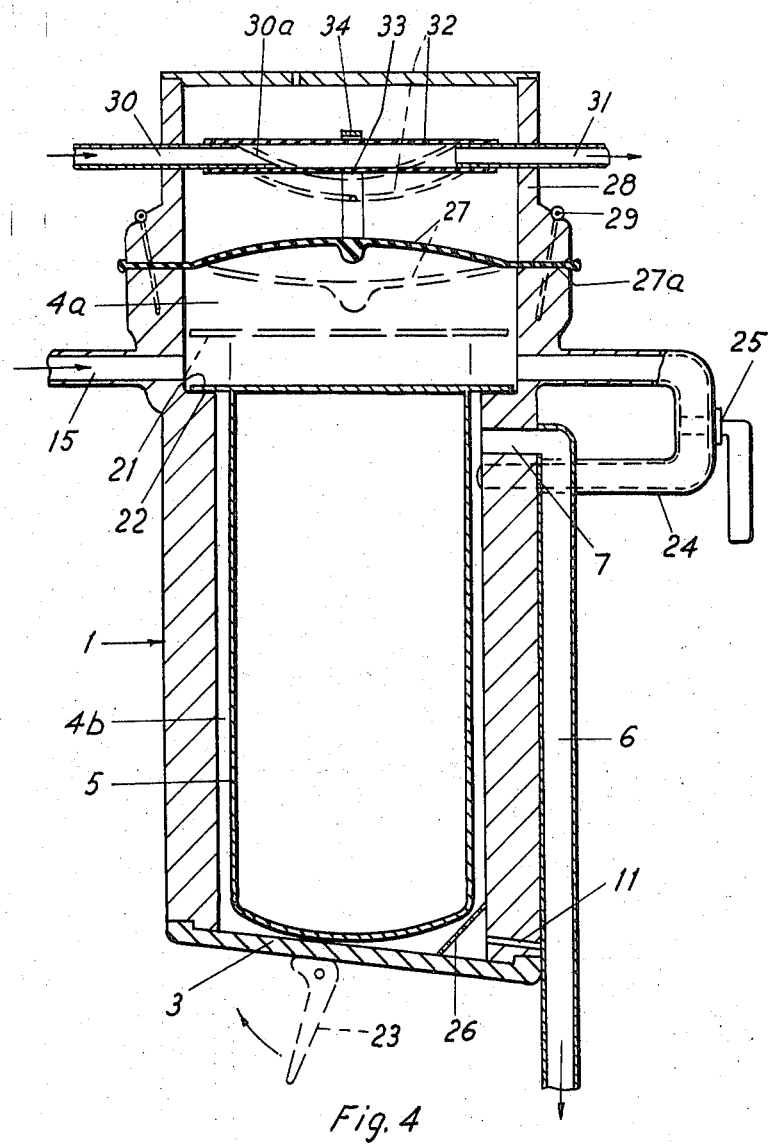
FIG. 4 is a sectional elevational view of a still further form of the invention, and including an additional modification to the invention which may be applicable to the other forms of the invention illustrated and described.

Referring now to FIG. 4 of the drawings, in further modifications of the invention and in a construction having a cylindrical float member 5 within a cylindrical body part 1, the upper end part of the float member 5 is provided with an annular outwardly directed flange or lip 21 which is arranged to act as a main valve member and to seat upon a complementary annular lip or shoulder 22 on the inner wall of the cylindrical body part 1 when the float member 5 is at its lower limit so that the interior of the body 1 is divided into an upper chamber part 4a and a lower chamber part 4b when the float member is at its said lower limit. A suitable rubber or resilient plastics O ring may be provided at the valve seat between the float member annular lip 21 and co-operating lip or shoulder 22 or the body part 1 to ensure a good seal.

The main milk inlet 15 from the teat cups to the body 1 is to a point above the valve seat and is thus to the upper chamber part 4a formed with the float member 5 at its lowest limit and closed on the valve seat, whereas the main milk outlet 7 for the vacuum supply/milk discharge tube 6 is to the upper part of the lower chamber 4b i.e. below the valve seat; the discharge tube 6 may be disposed externally of the main body part 1 and secured to or formed integrally therewith and the drain outlet 11 is provided by an aperture extending through the wall of the body part 1 near the base thereof and into the adjacent discharge tube 6. In order to supply vacuum to the milk inlet 15 and teat cups the upper and lower chamber parts 4a and 4b, can be placed in communication by raising the float member 5 to lift the annular flange or lip 21 thereof off the co-operating lip or shoulder 22 of the body part 1 such as by any of the previously described arrangements e.g. by providing a manually, mechanically or electrically operated plunger in the bottom wall to lift the float member 5, or by providing a resilient bottom wall 3 and a cam like lever member 23 to depress the bottom wall 3 inwardly and lift the float member (in FIG. 4 such a cam like operating lever 23 is illustrated in broken outline). Alternatively, a by-pass tube or passage 24 may be provided to connect the upper and lower chamber parts 4a and 4b above and below the float valve flange or lip 21, and such by-pass tube 24 being provided with an on/off tap or valve 25 which may be initially opened so that when vacuum is applied to the lower chamber part 4b by way of the vacuum supply/milk discharge tube 6, such vacuum is also directed to the upper chamber part 4a and thus the milk inlet 15 and teat cups. The by-pass tube 24 may alternatively communicate the chamber upper part 4a directly with a lower part of the discharge tube 6 as in the construction according to FIG. 1. On application of the teat cups and commencement of milk flow sufficient to raise the float member 5 and maintain the float member 5 with its valve flange or lip 21 open or off the co-operating body part shoulder or lip 22, the by-pass tube tap 25 may be closed and milking allowed to continue until its flow rate falls below that which can pass through the main outlet 7 and drain outlet 11 whereupon the float valve flange or lip 21 seats upon the co-operating shoulder or lip, 22 of the body part 1 to seal the lower chamber part 4b from the upper chamber part 4a and cut off vacuum to the milk inlet 15 and teat cups, whereupon the teat cups may release and fall away from the udder, the remaining milk in the lower chamber part 4b draining out through the drain outlet 11.

In all forms of the invention, a mesh or like screen can be provided within the valve unit body, the screen being above the float and below the milk inlet in the earlier described units, and adjacent the drain outlet in the latter arrangement described with reference to FIG. 4 (a suitable screen being denoted by the numeral 26), the cylindrical valve body 1 or the upper end wall 2 being manufactured of glass or transparent plastics material so that evidence of mastitis, e.g. mastitis flakes, collecting adjacent the screen may be easily sn and identified.

In a still further modification to the invention, and as illustrated in FIG. 4, the sensing valve unit is also arranged to actuate a vacuum cut off valve unit connected to a vacuum operated cylinder and plunger unit (not shown) which is coupled directly or indirectly to the teat cup claw assembly and arranged to withdraw the claw assembly and support such claw assembly above the ground following release of the claw assembly from the udder of an animal that has been milked. The vacuum cut off valve unit may be formed as part of the milk flow sensing valve unit and comprise a rubber or resilient plastics diaphragm 27 which forms the upper end wall of the valve sensing unit. The diaphragm may have its peripheral edge portion 27a clamped to the upper periphery of the cylindrical body part 1 of the valve sensing unit such as providing an upper housing or extension 28 to the cylindrical body part 1 which may be clipped to the body part 1 with such as two diametrically opposed spring clips 29 in the manner of a distributor cap for an internal combustion engine. A vacuum supply rigid tube connection 30 is provided at one side of the housing 28 and a complementary rigid tube connection 31 is provided at the opposite side of the housing 28 and connected to a conduit leading to the cylinder of the vacuum operated claw withdrawal unit. The vacuum inlet tube connection 30 has its open end 30a cut at an inclination to its axis so as to be angled downwardly and inwardly, and the two rigid connections 30 and 31 are conjoined by a flexible rubber or resilient plastics tube 32 having a small transverse slit 33 cut in the lower medial part thereof so that whilst the flexible resilient tube 32 is in the normal horizontal (or arced upwardly) position the slit 33 is closed to provide communication between the two rigid vacuum connections 30 and 31, but if the flexible tube 32 has its medial portion arced downwardly, the slit 33 opens to admit air to the vacuum line. The diaphragm 27 has an upwardly extending bridge or hooked portion 34 having an upper end part extending over and arranged to engage with the upper surface of the medial part of the flexible tube 32 and the arrangement thus provides that when vacuum is supplied to the upper chamber part 4a of the milk flow sensing unit the diaphragm 27 is pulled downwardly to thus bend the flexible tube 32 downwardly and open the slit 33 in the lower part thereof to thus break the vacuum to the withdrawal cylinder and permit the teat cup claw connected thereto to be pulled away and the teat cups connected to an animal's udder. Whilst vacuum is maintained in the upper chamber part 4a of the sensing valve unit, and during milking, the diaphragm 27 is maintained in its downwardly pulled position and the upper flexible tube 32 similarly maintained in its downwardly pulled position and there is no vacuum to the withdrawal cylinder. On milking cessation and closure of the float member valve flange 21 on the cooperating shoulder or lip 22 of the body part 1, and breaking of vacuum to the upper chamber part 4a, the diaphragm 27 is permitted to immediately return to its normal horizontal or upwardly arced position to allow the upper flexible tube 32 to return to its normal position and the slit 33 to close, whereupon vacuum is immediately applied to the withdrawal cylinder and the released teat cup claw assembly is retracted to the required 'home' supported position above the ground ready for the next sequence of operations. In addition to its inherent resilience, the diaphragm 27 can be spring biased upwardly.

The preferred construction provides that the vacuum cut off unit is, as described and illustrated, a single unit, but if so desired the vacuum cut off valve unit for the withdrawal cylinder can be separated from the valve sensing unit and positioned at another point in the line. Also, the vacuum cut off valve unit described and illustrated with reference to FIG. 4 may be applied to the earlier described and illustrated forms of the sensing valve unit.

The preferred constructions of sensing valve in accordance with the invention provide that at least the upper or lower wall is detachable for cleaning purposes and the lower wall is inclined downwardly towards the drain outlet. Further, the invention has been described with reference to a single sensing valve unit with an individual float lift plunger or lever, or with an individual by-pass tap, but it is envisaged that a series of similar units such as in a herringbone shed may have their float lift members or by-pass taps interconnected such as with a conjoining cord or link so that all float lift members or by-pass taps can be actuated together such as by an operator at one end of the milking shed.

Particular forms of the invention have been described and illustrated by way of example, but it will be appreciated that other variations of and modifications to the invention can take place without departing from the scope of the appended claims.

We claim:

1. A milk flow sensing valve unit for effective teat cup release comprising a hollow body defining a milk receiving float chamber, a float member within the chamber, a milk inlet to the chamber and through which milk from the milking teat cups can pass, a vacuum supply and milk discharge conduit connected to the body and having a main outlet opening to another part of the chamber and whereby vacuum is supplied to the chamber and inlet, valve means actuable by the float member and held open by the float member on filling of the chamber with milk to permit milk discharge through the main outlet, drain means for emptying the chamber after cessation of milking, and there being means to effect initial supply of vacuum from the main outlet to the chamber and inlet to enable commencement of milking and the valve means being closable by the float member at least to substantially reduce vacuum to the chamber upper part and the inlet on cessation or substantial lessening of milk flow from the teat cups so that such vacuum reduction permits release of the teat cups from the animal, the float chamber and float member being cylindrical in form and an upper part of the float member being provided with an annular outwardly directed flange or lip which is arranged to seat upon a complementary annular lip or shoulder on the inner wall of the cylindrical body part when the float member is at its lower limit so that the main float chamber is divided into upper and lower chamber parts when the float member is at its said lower limit, said flange forming a valve and the said annular lip or shoulder forming or provided with a valve seat, the milk inlet from the teat cups to the body entering at the chamber upper part and the main milk outlet for the vacuum supply/milk discharge conduit entering to an upper part of the lower chamber part, and a drain outlet extending from the bottom part of the lower chamber part and being in communication with the discharge conduit.

2. A sensing valve unit as claimed in claim 1 wherein at least part of the base of the hollow body is formed as or provided with a resilient diaphragm which is arranged to be depressed inwardly of the chamber by a cam-like lever or trigger so that the inner surface of such a diaphragm can contact and lift the float member to cause actuation of the valve means to permit initial supply of vacuum to the chamber and inlet and teat cups in permitting milking operations to commence.

3. A sensing valve unit as claimed in claim 1 wherein a by-pass tube connects the upper and lower chamber parts and such by-pass tube is provided with an on/off tap whereby vacuum to the lower chamber part can be by-passed to the upper chamber part and inlet on opening of the by-pass tap to commence milking operations, the by-pass tap being closed when milk flow commences sufficiently to raise the float member and lift its valve flange off the co-operating valve seat shoulder of lip of the body.

4. A sensing valve unit as claimed in claim 1 and having an upper end wall comprising a resilient diaphragm member which is connected to and arranged to move and actuate a flexible tubular valve in a vacuum line adapted to be connected to a vacuum cylinder which is arranged to effect withdrawal and support of the teat cup assembly upon release from an animal on cessation of milking.

5. A sensing valve unit as claimed in claim 4 wherein the flexible tubular valve member forms a bridging connection between two rigid tube parts in the vacuum line, one of said parts having its open end inclined relative to the tube axis downwardly and inwardly of the flexible tube so that the upper wall part of the flexible tube is capable of closing on and sealing such inclined tube end when the medial part of the flexible tube is moved downwardly, the lower medial part of the flexible tube being also provided with a transverse slit which is normally closed but is arranged to open on downward flexing of the tube medial part, the arrangement providing that when vacuum is applied to the float chamber, the diaphragm upper end wall is drawn downwardly to thus pull the flexible tube downwardly to open the slit and close off the inclined end of the vacuum tube rigid part, vacuum supply to the withdrawal cylinder being thus cut off and air admitted to the vacuum cylinder by way of the opened slit.

* * * * *